(12) United States Patent
Tsuzuki et al.

(10) Patent No.: US 10,598,772 B2
(45) Date of Patent: Mar. 24, 2020

(54) SENSOR, SENSOR SYSTEM AND MEASURING METHOD

(71) Applicant: OMRON Corporation, Kyoto (JP)

(72) Inventors: Ryosuke Tsuzuki, Ayabe (JP); Koyo Ozaki, Kyoto (JP); Shoichi Ohnaka, Kameoka (JP); Hikaru Arita, Fuchu (JP)

(73) Assignee: OMRON Corporation, Kyoto (JP)

( * ) Notice: Subject to any disclaimer, the term of this patent is extended or adjusted under 35 U.S.C. 154(b) by 556 days.

(21) Appl. No.: 15/379,498

(22) Filed: Dec. 15, 2016

(65) Prior Publication Data

US 2017/0212227 A1 Jul. 27, 2017

(30) Foreign Application Priority Data

Jan. 21, 2016 (JP) .................................. 2016-009783

(51) Int. Cl.
*G01S 7/491* (2020.01)
*G01S 17/08* (2006.01)
*G01S 7/4913* (2020.01)
*G01D 3/08* (2006.01)
*H04L 29/08* (2006.01)

(52) U.S. Cl.
CPC .............. *G01S 7/4913* (2013.01); *G01D 3/08* (2013.01); *G01S 17/08* (2013.01); *H04L 67/12* (2013.01)

(58) Field of Classification Search
CPC ......... G01S 7/4913; G01S 17/08; G01D 3/08; H04L 67/12
See application file for complete search history.

(56) References Cited

U.S. PATENT DOCUMENTS

| | | | | |
|---|---|---|---|---|
| 2004/0124337 | A1* | 7/2004 | Gondo | G01J 1/02 250/214 A |
| 2014/0324389 | A1* | 10/2014 | Baldwin | G01D 9/005 702/187 |
| 2016/0366065 | A1* | 12/2016 | Kazanchian | H04W 4/80 |

FOREIGN PATENT DOCUMENTS

| | | |
|---|---|---|
| CN | 203870252 | 10/2014 |
| EP | 2910981 | 8/2015 |
| JP | 2002171162 | 6/2002 |
| JP | 2010165270 | 7/2010 |
| JP | 2013077197 | 4/2013 |

OTHER PUBLICATIONS

"Search Report of Europe Counterpart Application", dated Jun. 6, 2017, p. 1-p. 7.
"Office Action of Japan Counterpart Application," dated Oct. 9, 2018, with English translation thereof, p. 1-p. 4.
"Office Action of China Counterpart Application," dated Oct. 29, 2018, with English translation thereof, p. 1-p. 17.
Office Action of China Counterpart Application, with English translation thereof, dated Apr. 12, 2019, pp. 1-15.

* cited by examiner

*Primary Examiner* — Regis J Betsch
*Assistant Examiner* — Jeremy A Delozier
(74) *Attorney, Agent, or Firm* — JCIPRNET

(57) ABSTRACT

The present invention achieves a sensor that can be used more efficiently than before. The sensor (1) includes: an operator (11) that accepts a mechanical operation of a user, and generates an operation input value corresponding to the operation; a communication portion (12) that receives a communication input value; and a CPU (14) that changes sensitivity of the sensor (1) according to a later input one of the operation input value and the communication input value.

7 Claims, 3 Drawing Sheets

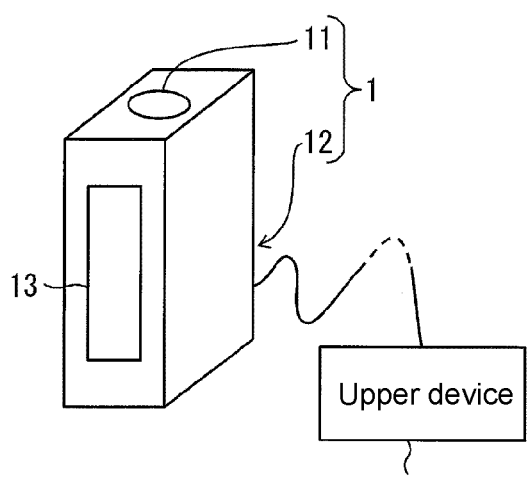
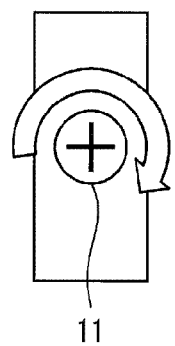
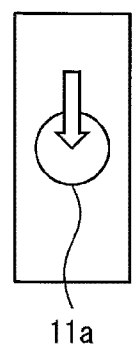
FIG. 1(a)    FIG. 1(b)   FIG. 1(c)
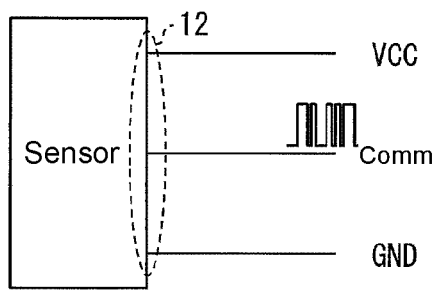
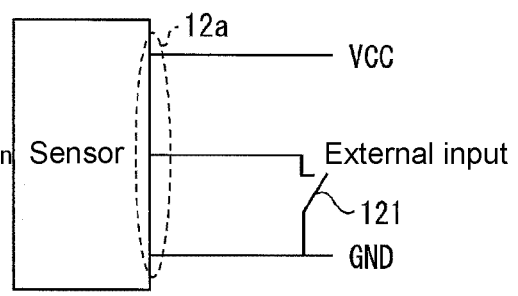
FIG. 1(d)    FIG. 1(e)

| Time | a | b1 | b2 | b3 | b4 | b5 | b6 | c | ... | d | f |
|---|---|---|---|---|---|---|---|---|---|---|---|
| Volume AD value [digit] | 2000 | 2056 | 2065 | 2069 | 2080 | 2085 | 2081 | 2079 | ... | 2080 | 2081 |

SENSOR, SENSOR SYSTEM AND MEASURING METHOD

CROSS-REFERENCE TO RELATED APPLICATION

This application claims the priority benefit of Japanese application serial no. 2016-009783, filed on Jan. 21, 2016. The entirety of the above-mentioned patent application is hereby incorporated by reference herein and made a part of this specification.

BACKGROUND OF THE INVENTION

1. Field of the Invention

The present invention relates to a sensor that measures physical quantity based on a set value, a sensor system having the sensor, and a measuring method that measures physical quantity based on a set value.

2. Description of Related Art

In recent years, with Internet of Things (IoT) and informatization of manufacturing apparatuses/devices, productivity, quality, reliability and the like are improved, and market input of optimal-quantity goods in a shorter period is advancing. For example, a sensor as the lowest layer is also networked, which seeks efficiency of start, maintenance and care of apparatuses, or collects real-time information of the sensor as big data and performs feedback and control, thereby improving the quality and the like.

In the past, in the case of a sensor not connected with an upper device, start, maintenance and care of devices are performed with the following methods such as (1) and (2).

(1) A volume installed to a frame is rotated, so as to continuously change the sensitivity to be set as an optimal value.

(2) A teaching button installed to a frame is pressed down, so as to automatically set the sensitivity as an optimal value.

Moreover, in the case of a sensor connected with an upper device, the value of the sensitivity can be set freely through communication from the upper device.

Patent Document 1 discloses an interconnected sensor system having a network unit and multiple sensor units.

PRIOR ART DOCUMENT

Patent Document

Patent Document 1: Japanese Patent Publication Gazette No. 2010-165270 (published on Jul. 29, 2010)

SUMMARY OF THE INVENTION

Issue to be Solved by the Invention

However, in the case of a sensor not connected with an upper device, each sensor has to be set directly, and the efficiency is poor in each working procedure.

Moreover, in the case of a sensor connected with an upper device, which of the value set on the frame (described as "frame setting" later) and the value set through communication of the upper device (described as "communication setting" later) is valid is switched, after the setting is made through communication, when a fault occurs during operation, the communication setting has to be set as invalid by using the communication from the upper device once, and after the frame setting is set as valid, on-site responses are made, which is thus ineffective.

The present invention is accomplished in view of the problem, aimed at achieving a sensor that can be used more efficiently than before.

Technical Means of Solving the Issue

To solve the issue, the sensor of the present invention measures physical quantity based on a set value, the sensor including: an operator that accepts a mechanical operation of a user, and generates an operation input value corresponding to the operation; a communication portion that receives a communication input value; and a setting portion that updates the set value according to a later input one of the operation input value and the communication input value.

In the sensor that measures physical quantity based on a set value, sometimes the set value is updated to any of multiple input values.

In such a sensor, when the sensor does not operate according to the user's assumption, preferably, the user, for example, performs a mechanical operation on an operator disposed in a frame of the sensor, so as to be able to update the set value near the sensor.

At this point, in the former sensor, the behavior of the sensor has to be changed in a manner of omitting any of the multiple input values. Therefore, users of the former sensor cannot use the sensor efficiently.

On the other hand, in the sensor of the present invention, according to the structure, the setting portion updates the set values to a later input one of the following (1) and (2).

(1) an input value generated by the operator (operation input value), and (2) an input value received by the communication portion (communication input value).

Therefore, the sensor can measure physical quantity based on a set value without receiving an instruction indicating that which of (1) and (2) should be adopted from the user of the sensor.

According to the above, the user of the sensor can use the sensor more efficiently than before.

In addition, the so-called "updating according to a later input one" includes: the setting portion converts any input value in the operation input value and the communication input value, and updates the set value to a converted input value.

Moreover, the setting portion's updating the set value is not limited to once. After the set value is updated, the setting portion can further update the set value to the input value input as long as any input value in the operation input value and the communication input value is input.

Moreover, the operator may also have an operation movable portion listed in the following.

A so-called "volume" that continuously changes the set value of the sensor by rotation A teaching button that automatically optimizes the set value of the sensor by press-down A button that increases/decreases the set value of the sensor by press-down Preferably, the operator includes an operation movable portion, the an operation movable portion changes a configuration angle or configuration position according to the mechanical operation of the user, and the operation input value is the configuration angle or configuration position of the operation moveable portion.

According to the structure, the operator may generate the operation input value from the configuration angle or configuration position of the operation moveable portion through a mechanical operation of rotating or displacing the operation moveable portion. Thus, after the operation of the operation moveable portion, the set value is updated immediately.

At this point, the appearance of the operator will change according to the configuration angle or configuration position of the operation moveable portion. Hence, the user can discriminate the updated set value. Thus, the sensor does not need to have a display device that displays the updated set value. Therefore, the sensor can be miniaturized.

The operation moveable portion, for example, is the so-called "volume" that continuously changes the set value of the sensor by rotation. At this point, the mechanical operation is an operation of rotating the volume.

Preferably, the setting portion samples the operation input value with a fixed sampling cycle, when an absolute value of a difference between the operation input value sampled at a determination starting time and the operation input value sampled from the determination starting time to a time prior to the sampling cycle, i.e., a reference value, is equal to or above a specified value, starts counting the number of sampling of the operation input value, when an absolute value of a difference between the operation input value sampled at a time after the determination starting time and the reference value is equal to or above the specified value, increases the number of sampling, and starts updating the set value to the operation input value at a time when the number of sampling reaches a specified number.

According to the structure, the setting portion can be prevented from updating an operation input value which is not preferably updated to the set value in the operation input value to the set value.

Thus, the user of the sensor can utilize the set value of communication for updating and can efficiently utilize the set value of the operator for updating.

"an operation input value which is not preferably updated to the set value" is an operation input value an absolute value of a difference between which and a reference value is less than a specified value.

"specified value" is a quantity that the absolute value of the difference between the operation input value and the reference value may change when the operation input value changes due to factors (e.g., electrical noise) other than the operation of the operator.

The so-called "the absolute value is equal to or above the specified value" refers to that the absolute value is a specified value or the absolute value exceeds the specified value. In addition, in the structure, the sensor having a structure specified as "the absolute value exceeds the specified value" is also included in the present invention.

"specified number" is the number of times the setting portion samples the operation input value within an appropriate period of continuation of the operation of the operator.

In addition, when the sampling cycle of the setting portion is low, even if the absolute value of the difference between the operation input value and the reference value is equal to or above the specified value, the setting portion sometimes may still sample an operation input value an absolute value of a difference between which and a reference value is less than the specified value if the sampling cycle is increased, i.e., the operation input value sampled within a fixed period is increased. According to the structure, the operation input value whose absolute value is less than the specified value will be omitted.

Preferably, when the absolute value of the difference between the operation input value sampled at a time after the determination starting time and the reference value is less than the specified value, the setting portion stops the counting, and sets the number of sampling as 0.

According to the structure, when sampling an operation input value an absolute value of a difference between which and a reference value is less than the specified value, the setting portion stops counting the number of sampling, and sets the number of sampling as 0. Hence, the setting portion can be really prevented from updating an operation input value which is not preferably updated to the set value in the operation input value to the set value.

Preferably, if a variation of the sampled operation input value is included in a specified variation amplitude above a fixed period counted from that the number of sampling reaches the specified number, the setting portion stops the counting, and sets the number of sampling as 0.

According to the structure, the setting portion can be really prevented from updating an operation input value which is not preferably updated to the set value in the operation input value (e.g., an operation input value varying significantly instantly) to sensitivity.

"fixed period" is an appropriate period from when the operation is operated to next time the operation is operated.

"specified variation amplitude" is an appropriate variation amplitude from when the operation of the operator stops to after the operation input value is converged to a fixed value.

The sensor of the present invention may also further include a measuring portion that projects and receives light, and the sensor being any photoelectric sensor of the following (1) to (3), (1) a photoelectric sensor that amplifies a signal corresponding to light quantity of the light received by the measuring portion to a multiple of the set value updated by the setting portion, and determines whether amplitude of the signal amplified exceeds a threshold, (2) a photoelectric sensor that amplifies intensity of the light projected by the measuring portion to a multiple of the set value updated by the setting portion, and determines whether amplitude of a signal corresponding to light quantity of the light received by the measuring portion exceeds a threshold, and (3) a photoelectric sensor that receives light reflected from an object through the measuring portion, so as to measure a distance between the object and the sensor, and determines whether the distance exceeds the set value updated by the setting portion.

According to the structure, a photoelectric sensor that can be used more efficiently than before may be achieved.

In addition, the sensor of (3) may specifically be a photoelectric sensor that judges a distance between the object and the sensor is closer or farther than the reference distance, a Time of Flight (TOF) measuring manner/phase difference manner/triangular ranging manner/Pseudo Noise (PN) code manner and other manners.

The sensor system of the present invention has the sensor and an upper device connected to the communication portion.

In the sensor system having the sensor that measures physical quantity based on a set value and an upper device thereof, the upper device sometimes sends an input value to the sensor, and updates the set value of the sensor through communication.

At this point, in the former sensor system, the behavior of the sensor has to be changed through communication in a manner of invalidating the updating of the set value of the sensor by means of communication.

On the other hand, in the sensor system of the present invention, according to the structure, the setting portion of the sensor updates the set value to a later input one of the following (1) and (2).

(1) an input value generated by the operator (operation input value), and (2) an input value received by the communication portion (communication input value).

Therefore, the sensor can also measure physical quantity based on a set value even if the user of the sensor system does not perform the following operation. The operation is: in order to invalidate the updating of the set value of the sensor by means of communication, changing the behavior of the sensor through communication, to avoid updating (2) to the set value of the sensor.

According to the above, the user of the sensor system can manage the sensor more efficiently than before.

In addition, the so-called "an upper device connected to the communication portion" refers to a structure where the upper device and the communication portion conduct communication therebetween. The communication may be wired communication and may also be wireless communication.

The measuring method of the present invention measures physical quantity based on a set value, the measuring method including: an operating step of accepting a mechanical operation of a user, and generating an operation input value corresponding to the operation; a communication step of receiving a communication input value; and a setting step of updating the set value to a later input one of the operation input value and the communication input value.

According to the method, in the setting step, the set value is updated to a later input one of the following (1) and (2).

(1) an input value generated by the operator (operation input value), and (2) an input value received by the communication portion (communication input value).

Therefore, even if any of (1) and (2) is not selected, the physical quantity can also be measured based on the set value.

According to the above, the physical quantity can be measured more efficiently than before.

Effects of the Invention

The present invention produces the following effects of (1)-(3).

(1) The user of the sensor can use the sensor more efficiently than before.

(2) The user of the sensor system can manage the sensor more efficiently than before.

(3) The physical quantity can be measured more efficiently than before.

BRIEF DESCRIPTION OF THE DRAWINGS

FIG. 1(a) to FIG. 1(e) are various diagrams of a structure of a sensor according to an embodiment of the present invention;

DESCRIPTION OF THE EMBODIMENTS

Structure of a Sensor

Figure 2:
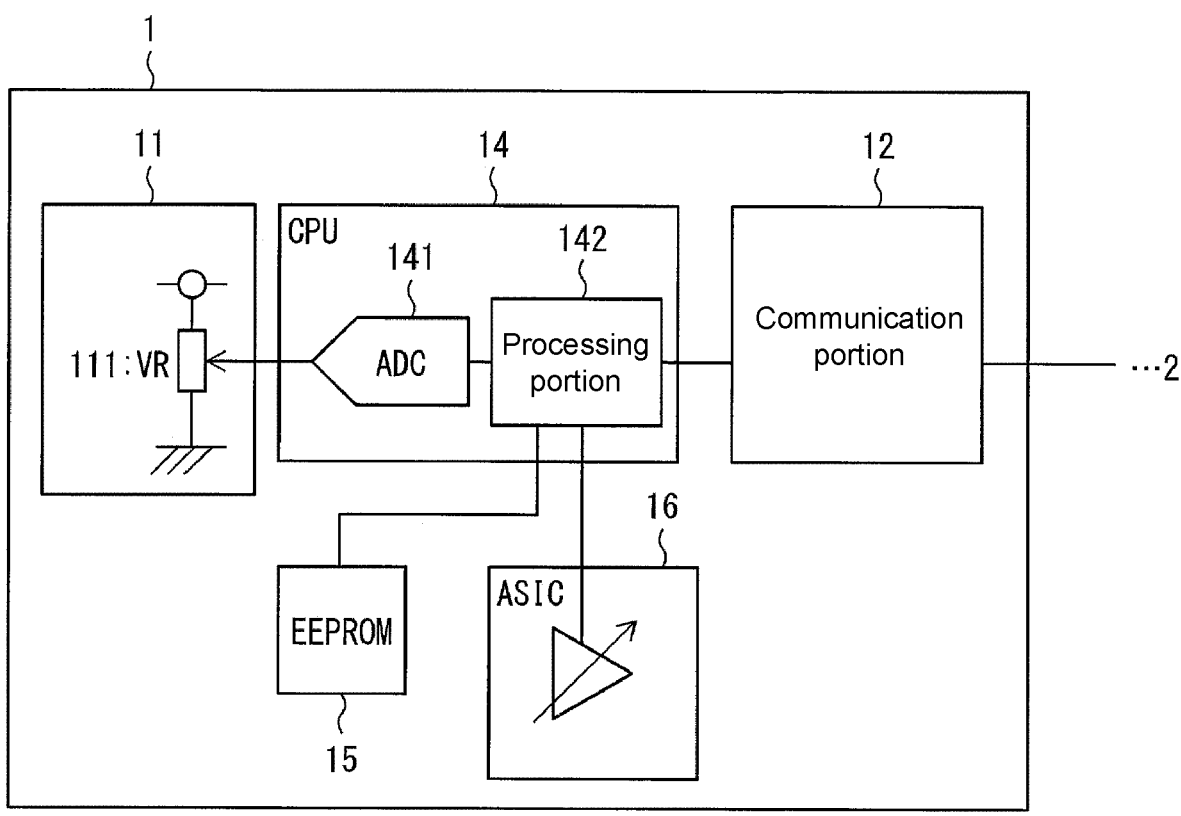
FIG. 2 is a block diagram of a detailed structure of the sensor shown in FIG. 1.

FIG. 1(a) to FIG. 1(e) are diagrams of a structure of a sensor 1 according to an embodiment of the present invention. FIG. 1(a) is a three-dimensional diagram of an overall structure of a sensor 1, FIG. 1(b) is a plane diagram of a structure of an operator 11 of the sensor 1, FIG. 1(c) is a plane diagram of a structure of a varying example of the operator shown in FIG. 1(b), FIG. 1(d) is a side view of a structure of a communication portion 12 of the sensor 1, and FIG. 1(e) is a side view of a structure of a varying example of the shown in FIG. 1(d).

As shown in FIG. 1(a), the sensor 1 has an operator 11 and a communication portion 12. The operator 11 is disposed on a frame of the sensor 1. The communication portion 12 is connected with an upper device 2. One side of the sensor 1 is provided with a measuring portion 13 for measuring physical quantity.

As shown in FIG. 1(b), the operator 11 has a so-called "volume", and the volume is an operation moveable portion for continuously changing sensitivity of the sensor 1 through rotation.

As shown in FIG. 1(d), a VCC/communication signal/GND is input into the communication portion 12. The communication signal is a signal transmitted and received between the upper device 2 and the communication portion 12.

(Detailed Structure)

FIG. 2 is a block diagram of a detailed structure of the sensor 1 shown in FIG. 1(a).

As shown in FIG. 2, the sensor 1 further has a Central Processing Unit (CPU) 14 (setting portion).

The CPU 14 is an operation processing block that performs processing through a CPU, and has an Analog Digital Converter (ADC) 141 and a processing portion 142.

The operator 11 has a Variable Resistor (VR) 111 (operation moveable portion). The VR 111 is connected to the ADC 141.

The ADC 141, the communication portion 12, an Electrically Erasable Programmable Read Only Memory (EEPROM) (registered trademark) 15 and an Application Specific Integrated Circuit (ASIC) 16 are connected on the processing portion 142.

Action of the Sensor

The sensor 1, as described later, measures physical quantity based on a set value.

"physical quantity", for example, is amplitude of amplitude/pressure/flow/vibration of light quantity/electrostatic capacitance/ultrasonic wave. That is, the sensor 1, for example, is a photoelectric sensor/proximity sensor/electrostatic capacitance sensor/ultrasonic sensors/pressure sensors/flow sensor/vibration sensor.

(Operation Input)

When the operator 11 is rotated, the resistance of the VR 111 (hereinafter referred to as "VR" value) changes.

The VR 111 acts as a sensitivity adjusting portion that adjusts sensitivity of the sensor 1.

"Sensitivity" is the set value of the sensor 1. Moreover, a signal corresponding to the light received by the measuring portion 13 is amplified to a multiple of the "sensitivity" updated by the CPU 14. The sensor 1 judges whether amplitude of the amplified signal exceeds a threshold.

The ADC 141 performs analog/digital (AD) conversion on the VR value.

A numerical value of the VR value is input to the processing portion 142 from the ADC 141. The numerical value is a value corresponding to a rotation operation performed on the operator 11.

As stated above, the operator 11 inputs an input value corresponding to the rotation operation to the CPU 14.

(Communication Input)

The upper device 2 sends an input value to the communication portion 12.

Communication between the upper device 2 and the communication portion 12 is communication on a physical layer of an Open System Interconnection (OSI) reference model. The communication signal in the communication is transmitted in a half duplex mode.

The communication portion 12 detects whether there is communication between the upper device 2 and the communication portion 12. Moreover, the communication portion 12 converts a level of the input value received, to enable the CPU 14 to perform processing.

As stated above, the communication portion 12 inputs the received input value to the CPU 14.

(Updating of the Sensitivity of the Sensor)

The ASIC 16 acts as a sensitivity change portion that changes the sensitivity of the sensor 1.

The processing portion 142 controls the ASIC 16, such that the ASIC 16 changes the sensitivity of the sensor 1 to an input value of any last input one of the input value generated by the operator 11 and the input value received by the communication portion 12.

The EEPROM 15 stores the sensitivity changed by the ASIC 16.

(Starting of Updating of the VR Value)

Figures 3A, 3B:
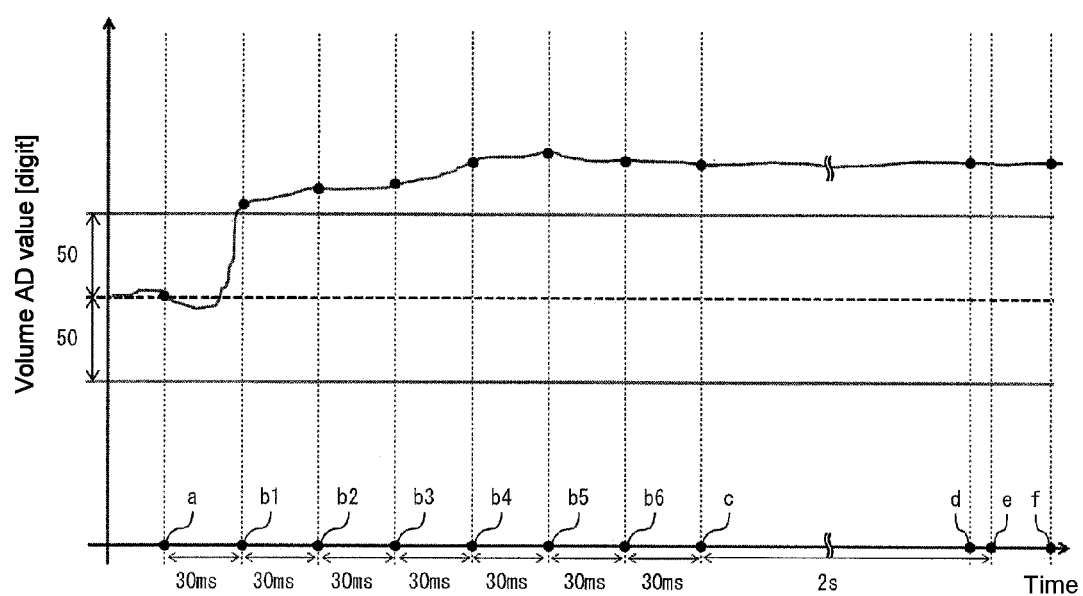
FIG. 3(a) and FIG. 3(b) are various diagrams of resistance changes of a variable resistor of an operator of the sensor shown in FIG. 2.

FIG. 3(*a*) and FIG. 3(*b*) are diagrams of changes of the VR value of the VR 111 of the operator 11 of the sensor 1 shown in FIG. 2. FIG. 3(*a*) is a chart, and FIG. 3(*b*) is a table corresponding to the chart shown in FIG. 3(*a*).

As shown in FIG. 3(*a*), in an example of the embodiment, the ADC 141 performs AD conversion on the VR value with a sampling cycle of 30 ms. The horizontal axis of the chart of FIG. 3(*a*) represents time. The vertical axis of the chart represents a VR value (volume AD value) converted by the ADC 141 to a digital value. The unit of the digital value is set as digit.

The processing portion 142 determines, based on the next starting reference, the VR value of Time a as a reference value, and starts counting the number of sampling of the VR value from Time b1 (determination starting time).

[starting reference] An absolute value of a difference between a VR value of a certain time and a VR value (reference value) prior to a sampling cycle counted from the certain time is equal to or above 50 digit (specified value).

As shown in FIG. 3(*b*), an absolute value of a difference between the VR value of Time b1 and the VR value of Time a prior to a sampling cycle compared with Time b1 is equal to or above 50 digit. Hence, the processing portion 142 counts the VR value of Time b1 as first time.

"50 digit" in the starting reference is a quantity that an absolute value of a difference between the input value and the reference value when the input value generated by the VR 111 of the operator 11 changes due to factors (e.g., electrical noise) other than the operation of the operator 11.

Thus, the specified value is not limited to 50 digit, as long as it is set as a specified valued other than the input value not preferably updated to the sensitivity of the sensor 1.

Moreover, the processing portion 142, based on the next increase reference, increases the number of sampling of the VR value after Time b1.

[Increase reference] An absolute value of a difference between a VR value and a reference value is equal to or above 50 digit (specified value).

An absolute value of a difference between the VR value of Time b2 and the VR value of Time a set as a reference value is equal to or above 50 digit. So is that from Time b3 to Time b6. Therefore, the processing 142 counts VR values from Time b2 to Time b6 as twice to six times respectively.

When the ADC 141 samples the VR value an absolute value of a difference between which and the reference value is less than 50 digit, the processing portion 142 stops counting the number of sampling, and sets the number of sampling as 0.

Moreover, the processing portion 142 updates the VR value to the sensitivity of the sensor 1 from the time when the number of sampling reaches 6 (specified number).

At this point, the number of sampling "6" is not limited to value, as long as it is the number of times the ADC 141 of the CPU 14 samples the VR value within an appropriate period of continuation of the operation of the operator 11.

In an example of the embodiment, the appropriate period of continuation of the operation of the operator 11 as a volume is at least 150 milliseconds (hereinafter referred to as "ms"), and the sampling cycle of the ADC 141 of the CPU 14 is 30 ms. Thus, the number of sampling is 6 times (=150/30+1) including the beginning and the ending of the period.

According to the above, the processing portion 142 of the CPU 14 can be prevented from updating the input value, which is not preferably updated to the sensitivity of the sensor 1 in the input value generated by the VR 111 of the operator 11, to the sensitivity.

(Stop of the Updating of the VR Value)

The processing portion 142, at a time after the number of sampling reaches 6, when a period during which the variation amplitude of the VR value is below 20 digit (specified variation amplitude) lasts 2 or more than 2 s (fixed period), stops updating the VR value to the sensitivity of the sensor 1.

Specifically, the number of sampling reaches 6 at Time b6. Moreover, from Time c after Time b6 to Time f, the period during which the variation of the VR value is below 20 digit lasts 2010 ms. Hence, from Time c after Time b6 to Time e, the period during which the variation of the VR value is below 20 digit lasts 2 or more than 2 s.

Moreover, the processing portion 142 stops updating the VR value to the sensitivity of the sensor 1 at Time f.

The "2 s" is not limited to the value, as long as it is an appropriate period from when the operator 11 is operated till next time the operator is operated.

The "20 digit" is not limited to the value, as long as it is appropriate variation amplitude of the VR value from when the operation of the operator 11 stops till after the VR value is converged to a fixed value.

According to the above, the processing portion 142 of the CPU 14 can be prevented from the input value which is not preferably updated to the sensitivity of the sensor 1 in the input value generated by the VR 111 of the operator 11 (e.g., an input value varying significantly instantly) to sensitivity.

Effects of the Embodiment

According to this embodiment, the CPU 14 of the sensor 1 updates the sensitivity of the sensor 1 to a later input one of the following (1) and (2).

(1) an input value generated by the operator 11 (operation input value), and (2) an input value received by the communication portion 12 (communication input value).

Therefore, the sensor 1 can measure physical quantity based on the sensitivity without receiving an instruction indicating that which of (1) and (2) should be adopted from the user of the sensor 1.

(Comparison with the Former Sensor)

In the sensor that measures physical quantity based on a set value such as sensitivity, sometimes the set value needs to be updated to any of multiple input values.

In such a sensor, when the sensor does not operate according to the user's assumption, preferably, the user, for example, performs an operation on an operator disposed in a frame of the sensor, so as to be able to update the set value near the sensor.

At this point, in the former sensor, the behavior of the sensor has to be changed in a manner of omitting any of the multiple input values. Therefore, users of the former sensor cannot use the sensor efficiently.

On the other hand, the sensor 1 of this embodiment can measure physical quantity based on the sensitivity as the set value without receiving an instruction indicating that which of the multiple input values should be adopted from the user of the sensor 1.

Thus, the user of the sensor 1 can use the sensor more efficiently than before.

(Operation Accepted by the Operator)

The operation accepted by the operator is a mechanical operation. The so-called "mechanical operation", for example, is the following listed.

A rotation operation of rotating a volume for continuously changing the sensitivity of the sensor 1

A operation of pressing down a teaching button that automatically optimizes the sensitivity of the sensor 1

A operation of pressing down a button that increases/decreases the sensitivity of the sensor 1

(Varying Example of the Operator)

As shown in FIG. 1(*c*), the operator 11 may also be a button 11*a* that causes the CPU 14 to update the sensitivity of the sensor 1 by press-down. Specifically, the operator 11 may also be a teaching button 11*a* that causes the CPU 14 to automatically optimize the sensitivity of the sensor 1 by press-down. Moreover, the operator 11 may also be a button 11*a* that increases/decreases the sensitivity of the sensor 1.

However, even if the button 11*a* is pressed down, the appearance may not change. Hence, the user of the sensor 1 cannot confirm how the CPU 14 updates the sensitivity of the sensor 1. Moreover, for example, when the sensor 1 does not operate according to the user's assumption, it is difficult for the user to operate the button 11*a* to update the sensitivity of the sensor 1 near the sensor 1.

At this point, preferably, the sensor 1 has a display device that displays the sensitivity (especially when the operator 11 is a button that increases/decreases the sensitivity of the sensor 1).

On the other hand, if the operator 11 of the sensor 1 is the button shown in FIG. 1(*b*), the operation input value can be generated from a VR value corresponding to a configuration angle of the volume by rotating the volume. Thus, after the operation of the button, the sensitivity of the sensor 1 is updated immediately.

At this point, the appearance of the operator 11 changes according to the configuration angle of the volume. Hence, the user can discriminate the sensitivity updated for the sensor 1. Thus, the sensor 1 does not need to have a display device that displays the updated sensitivity. Therefore, the sensor 1 can be miniaturized.

In addition, the operator 11 of the sensor 1 can also have an operation movable portion whose configuration position changes through a user's mechanical operation. At this point, the operation input value is the configuration position of the operation movable portion.

(Sampling Form of the VR Value)

In the structure, when the sampling cycle of the ADC 141 is low, even if the absolute value of the difference between the VR value and the reference value is equal to or above 50 digit, the ADC 141 sometimes may still sample a VR value an absolute value of a difference between which and a reference value is less than the specified value if the sampling cycle is increased, i.e., the VR value sampled within a fixed period is increased.

At this point, the processing portion 142 may not stop counting the number of sampling, but based on the increase reference, increases the number of sampling of the VR value after Time b1.

(Photoelectric Sensor)

In the structure, the CPU 14 updates the sensitivity of the sensor 1, but is not limited to this. Any parameter is ok as long as it is a parameter (set value) affecting the output value of the sensor.

Moreover, the measuring portion 13 of the sensor 1 may also be a photoelectric sensor that receives light and projects light. For example, the sensor 1 amplifies intensity of the light projected by the measuring portion 13 to a multiple of the parameter updated by the CPU 14, that is, light projecting power of the sensor 1 is amplified. Moreover, the sensor 1 judges whether amplitude of a signal corresponding to light quantity of the light received by the measuring portion 13 exceeds a threshold.

Moreover, the sensor 1 may also be a photoelectric sensor that judges a distance between the object and the sensor 1 is closer or farther than the reference distance, a Time of Flight (TOF) measuring manner/phase difference manner/triangular ranging manner/Pseudo Noise (PN) code manner and other manners.

At this point, the sensor 1 receives light reflected from the object through the measuring portion 13, so as to measure the distance between the object and the sensor 1, and judges whether the distance exceeds a threshold (set value) updated by the CPU 14.

(Measuring Method)

A measuring method described as follows is also included in the present invention. The measuring method measures physical quantity based on a set value such as sensitivity, including: an operating step of, as shown by the operator 11 in FIG. 2, accepting a mechanical operation of a user, and generating an operation input value corresponding to the operation; a communication step of, as shown by the communication portion 12 in FIG. 2, receiving a communication input value; and a setting step of, as shown by the CPU 14 in FIG. 2, updating the set value of the sensor 1 to a later input one of the operation input value and the communication input value.

(Sensor System)

As shown in FIG. 1(*a*), a sensor system having a sensor 1 and an upper device 2 connected to a communication portion 12 of the sensor 1 is also included in the present invention.

(Other Structure)

As shown in FIG. 1(*e*), the sensor 1 may also employ a structure of controlling a teaching action by making high/low inputs from the upper device 2.

Moreover, in the constitutive elements of the sensor 1, the CPU 14, the communication portion 12 and the ASIC 16 may also be replaced with other elements having the same functions.

Moreover, the communication between the upper device 2 and the communication portion 12 may be wired communication and may also be wireless communication.

The present invention is not limited to the various implementations, various changes can be made within the scope indicated in the claims, and implementations obtained by properly combining technical components disclosed in different implementations respectively are also included in the technical scope of the present invention.

What is claimed is:

1. A photoelectric sensor, measuring physical quantity based on a set value, wherein the photoelectric sensor comprises:
    an operator that accepts a mechanical operation of a user, and generates an operation input value corresponding to the operation;
    a communication portion that receives a communication input value;
    a setting portion that updates the set value according to a later input one of the operation input value and the communication input value;
    a measuring portion that projects and receives light, wherein the projected light or the received light is processed by according to the set value, and
    wherein the setting portion samples the operation input value with a fixed sampling cycle,
    when an absolute value of a difference between the operation input value sampled at a determination starting time and the operation input value sampled from the determination starting time to a time prior to the sampling cycle, i.e., a reference value, is equal to or above a specified value, starts counting the number of sampling of the operation input value,
    when an absolute value of a difference between the operation input value sampled at a time after the determination starting time and the reference value is equal to or above the specified value, increases the number of sampling, and
    starts updating the set value to the operation input value at a time when the number of sampling reaches a specified number.

2. The photoelectric sensor according to claim 1, wherein the operator comprises an operation moveable portion, the operation moveable portion changing a configuration angle or configuration position according to the mechanical operation of the user, and
    the operation input value is the configuration angle or configuration position of the operation moveable portion.

3. The photoelectric sensor according to claim 1, wherein when the absolute value of the difference between the operation input value sampled at a time after the determination starting time and the reference value is less than the specified value, the setting portion stops the counting, and sets the number of sampling as 0.

4. The photoelectric sensor according to claim 1, wherein if a variation of the sampled operation input value is comprised in a specified variation amplitude above a fixed period counted from that the number of sampling reaches the specified number, the setting portion stops the counting, and sets the number of sampling as 0.

5. The photoelectric sensor according to claim 1, wherein the photoelectric sensor is any one of the following (1) to (3),
    (1) a photoelectric sensor that amplifies a signal corresponding to light quantity of the light received by the measuring portion to a multiple of the set value updated by the setting portion, and determines whether amplitude of the signal amplified exceeds a threshold,
    (2) a photoelectric sensor that amplifies intensity of the light projected by the measuring portion to a multiple of the set value updated by the setting portion, and determines whether amplitude of a signal corresponding to light quantity of the light received by the measuring portion exceeds a threshold, and
    (3) a photoelectric sensor that receives light reflected from an object through the measuring portion, so as to measure a distance between the object and the sensor, and determines whether the distance exceeds the set value updated by the setting portion.

6. A sensor system, comprising:
    the photoelectric sensor according to claim 1; and
    an upper device connected to the communication portion.

7. A measuring method, measuring physical quantity based on a set value, wherein the measuring method comprises:
    an operating step of accepting a mechanical operation of a user, and generating an operation input value corresponding to the operation;
    a communication step of receiving a communication input value;
    a setting step of updating the set value to a later input one of the operation input value and the communication input value and sampling the operation input value with a fixed sampling cycle;
    projecting and receiving light, wherein the projected light or the received light is processed by according to the set value;
    when an absolute value of a difference between the operation input value sampled at a determination starting time and the operation input value sampled from the determination starting time to a time prior to the sampling cycle, i.e., a reference value, is equal to or above a specified value, starting counting the number of sampling of the operation input value;
    when an absolute value of a difference between the operation input value sampled at a time after the determination starting time and the reference value is equal to or above the specified value, increasing the number of sampling, and
    starting updating the set value to the operation input value at a time when the number of sampling reaches a specified number.

* * * * *